(12) United States Patent
Kovalick et al.

(10) Patent No.: US 10,774,503 B2
(45) Date of Patent: Sep. 15, 2020

(54) MOTOR GRADER WITH MID-MOUNT SCARIFIER SYSTEM

(71) Applicant: Caterpillar Inc., Deerfield, IL (US)

(72) Inventors: Benjamin J. Kovalick, Decatur, IL (US); David L. Cox, Monticello, IL (US); Bruce R. Vahling, Urbana, IL (US)

(73) Assignee: Caterpillar Inc., Peoria, IL (US)

( * ) Notice: Subject to any disclaimer, the term of this patent is extended or adjusted under 35 U.S.C. 154(b) by 207 days.

(21) Appl. No.: 15/959,413

(22) Filed: Apr. 23, 2018

(65) Prior Publication Data

US 2019/0323203 A1    Oct. 24, 2019

(51) Int. Cl.
| | |
|---|---|
| *E02F 3/76* | (2006.01) |
| *E02F 3/815* | (2006.01) |
| *E02F 3/84* | (2006.01) |
| *A01B 63/00* | (2006.01) |

(52) U.S. Cl.
CPC ............ *E02F 3/8155* (2013.01); *A01B 63/00* (2013.01); *E02F 3/764* (2013.01); *E02F 3/7645* (2013.01); *E02F 3/844* (2013.01)

(58) Field of Classification Search
CPC ............................... A01B 63/00; E02F 3/7645
USPC ........ 172/196–200, 398, 484, 763, 781, 787
See application file for complete search history.

(56) References Cited

U.S. PATENT DOCUMENTS

| | | | |
|---|---|---|---|
| 857,061 A * | 6/1907 | Henderson | A01B 63/166 172/386 |
| 1,833,878 A | 11/1931 | Adams | |
| 1,918,169 A | 7/1933 | Arndt | |
| 2,197,549 A | 4/1940 | Hargrave et al. | |
| 2,222,071 A | 11/1940 | Gustafson | |
| 2,228,865 A * | 1/1941 | Bird | A01B 13/08 172/398 |
| 2,249,807 A * | 7/1941 | Theophilus | A01B 63/1115 172/318 |
| 2,601,296 A * | 6/1952 | Johnson | A01B 3/34 172/206 |
| 2,993,285 A | 7/1961 | Hoxie | |
| 3,083,954 A | 4/1963 | Brolin | |
| 3,199,608 A * | 8/1965 | Robbins | A01B 13/16 172/234 |
| 3,327,413 A | 6/1967 | Brinkmeyer et al. | |
| 3,880,243 A | 4/1975 | Gurries et al. | |
| 3,907,450 A | 9/1975 | Cutler | |

(Continued)

FOREIGN PATENT DOCUMENTS

| | | |
|---|---|---|
| CN | 102359137 A | 2/2012 |
| CN | 202610868 U | 12/2012 |

(Continued)

*Primary Examiner* — Gary S Hartmann
(74) *Attorney, Agent, or Firm* — Schwegman, Lundberg & Woessner

(57) ABSTRACT

A motor grader including a frame and a scarifier system coupled to the frame. The scarifier system includes a first pin member and second pin member both coupled to the frame and interconnected to one another. The scarifier system also includes a first and second arcuate drawbar arms in spaced relation and coupled to the first pin member and a carriage. An actuator is coupled to the first arcuate drawbar arm and the second pin member to rotate the carriage about a pivot axis of the first pin member.

20 Claims, 3 Drawing Sheets

(56) References Cited

U.S. PATENT DOCUMENTS

| | | | | |
|---|---|---|---|---|
| 4,321,970 A * | 3/1982 | Thigpen | .................... | E02F 5/32 |
| | | | | 172/464 |
| 4,461,358 A * | 7/1984 | Lewison | .............. | A01B 61/046 |
| | | | | 172/705 |
| 4,512,090 A | 4/1985 | Billings | | |
| 6,098,722 A * | 8/2000 | Richard | ................. | A01B 35/30 |
| | | | | 111/151 |
| 6,681,867 B2 * | 1/2004 | Satzler | ................... | A01B 11/00 |
| | | | | 172/619 |
| 7,578,246 B2 * | 8/2009 | Ryder | .................... | A01C 7/205 |
| | | | | 111/136 |
| 7,793,739 B2 * | 9/2010 | Tiessen | ................ | A01B 61/046 |
| | | | | 172/705 |
| 8,534,373 B2 * | 9/2013 | Van Buskirk | ........ | A01B 29/048 |
| | | | | 172/166 |

FOREIGN PATENT DOCUMENTS

| | | |
|---|---|---|
| CN | 104929180 A | 9/2015 |
| WO | 2013000316 A1 | 1/2013 |

\* cited by examiner

MOTOR GRADER WITH MID-MOUNT SCARIFIER SYSTEM

TECHNICAL FIELD

This disclosure relates to a motor grader. More particularly, to a motor grader with a mounted scarifier system.

BACKGROUND

Motor graders are used to prepare the grade of a ground surface in an area. Grading can be provided for numerous reasons, including for roads, providing foundation, and the like where a uniform surface is desired for an end application. Motor graders generally are elongated vehicles that include multiple implements for performing such tasks.

Implements can include grader blade systems such as drawbar, circle mount, and moldboard (DCM) systems, dozer blade systems, scarifier systems, and the like. These implements are mounted to the motor grader frame for utilization as required. Mounting locations include, but are not limited to, a front mounting position, mid-mounting position, and back mounting position. The front mounting position of an implement is in the front of the frame, and specifically, where the implement extends in front of front wheels of the motor grader. This mounting position is typically for dozer blade systems. Similarly, the back-mounting position is at the back end of the frame and can include the ripper system and scarifier system.

Implements are also mounted onto the frame in a mid-frame mounting position. Mid-frame mounting, or mid-mount implements are positioned between the front end and back end of the motor grader. Typical implements having a mid-mount include the DCM system and scarifier system.

One of the main challenges for mid-mounted implements, such as scarifier systems, is spacing with other systems of the motor grader. Other systems include the wheels and axle, hydraulic systems, other implement systems, and the like. For example, many motor graders mid-mount both the DCM system and scarifier system between the cab of the motor grader and front wheels. The DCM system includes a frame with a drawbar that extends from a position behind the scarifier system and toward the front end of the frame for attachment to the frame between the front wheels. Thus, when mounting a mid-mount scarifier, not only do mounting, structural support, movement, and operational requirements, need to be taken into consideration, but additionally, the positioning and shape of the frame and other assemblies and systems of the motor grader.

A typical mid-mounted scarifier system includes drawbar arms that are secured to the motor grader frame and receive a scarifier carriage having teeth used to scarify the ground. To support and move the carriage from a non-working position to a working position often a complex linkage assembly is also coupled to the frame. Such linkage assemblies can include lift arms or rods, ball joints, shafts, mounting plates, adjustable lift cylinders, welded ball studs, and the like that are utilized to reinforce and move the drawbar arms.

While current scarifier systems allow movement as required by a user, systems remain complex, and spacing with regard to other assemblies and systems of the motor grader remain a concern. The linkage assembly often disrupts the line of sight of a user, making seeing objects in front of the machine and thus motor grader operation more difficult. Spacing between the scarifier system and other systems can be insufficient to prevent collision between the systems during operation. As an example, when traversing uneven and bumpy terrain, the drawbar arms or accompanying linkage assembly of the scarifier system can engage the tires, causing undesired wear and damage to the tires and scarifier system. Similarly, scarifier systems can engage other implements such as the DCM system causing damage and wear to each, including in some cases bending of the linkage assembly. Moreover, because of the complexity of the linkage assembly, and placement on the frame, typically replacing and retrofitting current scarifier systems is impracticable.

Some systems minimize or eliminate linkage assemblies in the scarifier system. As an example system where linkage is eliminated, the Dresser™ scarifier assembly provides a pivot pin secured to the frame adjacent a front end with side-by-side arcuate drawbar arms extending around each tire and extending to the scarifier carriage. Instead of a linkage assembly, dual hydraulic cylinders are welded above the front wheels at a first ball stud, and the hydraulic cylinders extend and are welded to the arcuate drawbar arms at a second ball stud adjacent the carriage and front wheels.

Still, even when linkage assemblies are minimized or eliminated, doing so results in additional design constraints. These can include additional costs, additional manufacturing time, difficulties in replacement, system wear, interference with line of sight of the driver, lack of ease and design flexibility for retrofitting, and the like.

SUMMARY OF THE INVENTION

One aspect of the disclosure is directed toward a motor grader including a frame and a scarifier system coupled to the frame. The scarifier system includes a first pin member and second pin member both coupled to an end of the frame. The scarifier system also includes first and second arcuate drawbar arms in spaced relation and coupled to the first pin member at one end and a carriage at a second end. An actuator is coupled to the first arcuate drawbar arm and the second pin member to rotate the carriage about a pivot axis of the first pin member.

Another aspect of the disclosure is directed toward a scarifier system that includes a first pin member coupled to a plate element and interconnected to a second pin member that is also coupled to the plate element. The scarifier system also includes first and second arcuate drawbar arms both coupled to the first pin member in spaced relation to one another and coupled to a carriage. An actuator is coupled to the first arcuate drawbar arm and to the second pin member to rotate the carriage about a pivot axis of the first pin member.

In another aspect of the disclosure, a method is provided for manufacturing a scarifier system. The method includes coupling a first pin member and second pin member to a plate element in spaced relation. First and second arcuate drawbar arms are pivotably secured to the first pin member, and a carriage to mounted to the first and second arcuate drawbar arms. The second pin member is coupled to the first arcuate drawbar arm with an actuator.

DETAILED DESCRIPTION

Figure 1:
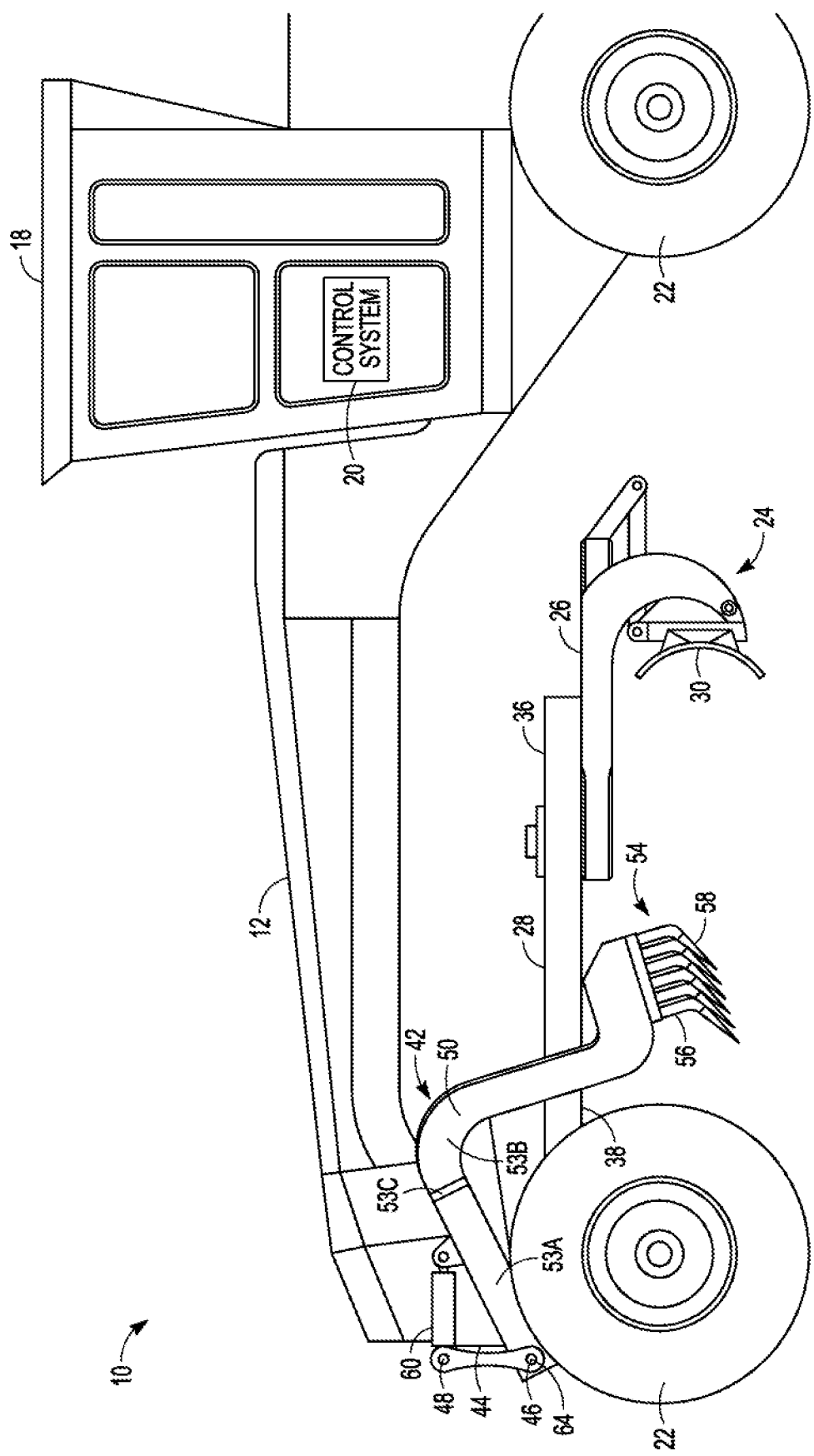
FIG. 1 shows a diagrammatic illustration of a portion of an exemplary motor grader vehicle.

FIG. 1 illustrates portions of an exemplary motor grader 10. The motor grader 10 includes a frame 12 that extends from a back end to front end. At the back end, the frame holds the engine, hydraulics, and the like for operating different systems and assemblies of the motor grader 10. The frame 12 in one example receives a cab 18 that includes a control system 20 for operation by an operator within the cab 18 of the different operating systems and assemblies. Such operating systems and assemblies include, but are not limited to hydraulic systems, vehicle propelling, vehicle steering, implement controls, and the like. The frame 12 also has a plurality of wheels 22, including at the back and front ends. Based on the length of the frame, the motor grader 10 can have additional wheels to support the frame 12.

A drawbar, circle, and moldboard (DCM) system 24 is coupled to the frame 12. The DCM includes a circle frame 26, support frame 28, and moldboard or blade 30. The support frame 28 in one example has a generally A-shape tapering inwardly from a first end 36 coupled to the circle frame 26 to a second end 38 adjacent the front wheels 22. In other examples the support frame includes other shapes, including being generally Y-shaped.

A scarifier system 42 is also coupled to the frame, forward of the blade 30 of the DCM system 24. The scarifier system 42 includes a plate element 44 coupled to the front end of the frame 12 of the motor grader 10. At the front end, the plate element 44 receives first and second pin members 46 and 48 that are aligned and positioned in parallel spaced relation to one another. In an example, the first and second pin member 46 and 48 are positioned at the front end of the frame 12 in front of the axle of the front wheels 22. In one example, the first pin member is a pivot pin and the second pin member is a cylindrical pin. In yet another example the plate element 44 is coupled to the frame 12 with fasteners such as bolts. In another example the plate element 44 is welded to the front end of the frame 12.

The scarifier system 42 also includes arcuate drawbar arms 50 that are spaced from one another on each side of the frame such that the frame is between the arms 50. Each drawbar arm 50 in one example is pivotably coupled to the first pin member 46 coupled to the plate element 44. Alternatively, the drawbar arms 50 are pivotably coupled to the first pin member 46 when the first pin member 46 is disposed through the frame 12 at an end of the frame 12. In such an embodiment, the plate element is eliminated.

Each drawbar arm 50 includes a coupling section 53A that extends into an arcuate section 53B at a knee 53C, where each coupling section 53A is forward each arcuate section 53B and couples to the first pin member 46. Each arm 50 extends from the first pin member 46 at one end to a carriage 54 mounted between the arcuate section 53B of each drawbar arm 50 at another end. The carriage 54 includes shanks 56 and teeth 58 for engaging the ground in an operational position.

Additionally, at least one actuator 60 is coupled to a drawbar arm 50. In one example, two actuators 60 extend generally horizontal to the ground and in spaced relation on either side of the frame such that the frame 12 is between the actuators 60. In an example, the actuators 60 are hydraulic actuators such as hydraulic cylinders coupled to the hydraulic system of the motor grader 10 that hydraulically actuate the actuators 60. Alternatively, in another example a motor mechanically actuates the actuators 60.

In yet another example, the actuator 60 couples to the coupling section 53A of a drawbar arm 50 above the frame 12 when the scarifier system 42 is in a non-working position. In another example, the actuator 60 couples to the coupling section 53A of a drawbar arm 50 forward of each arcuate section 53B of the drawbar arm 50. The actuators 60 are coupled between the second pin member 48 and the drawbar arms 50 to move the drawbar arms 50 to rotate the carriage from a working position to a non-working position about a pivot axis 64 of the first pin member 46.

Figure 2:
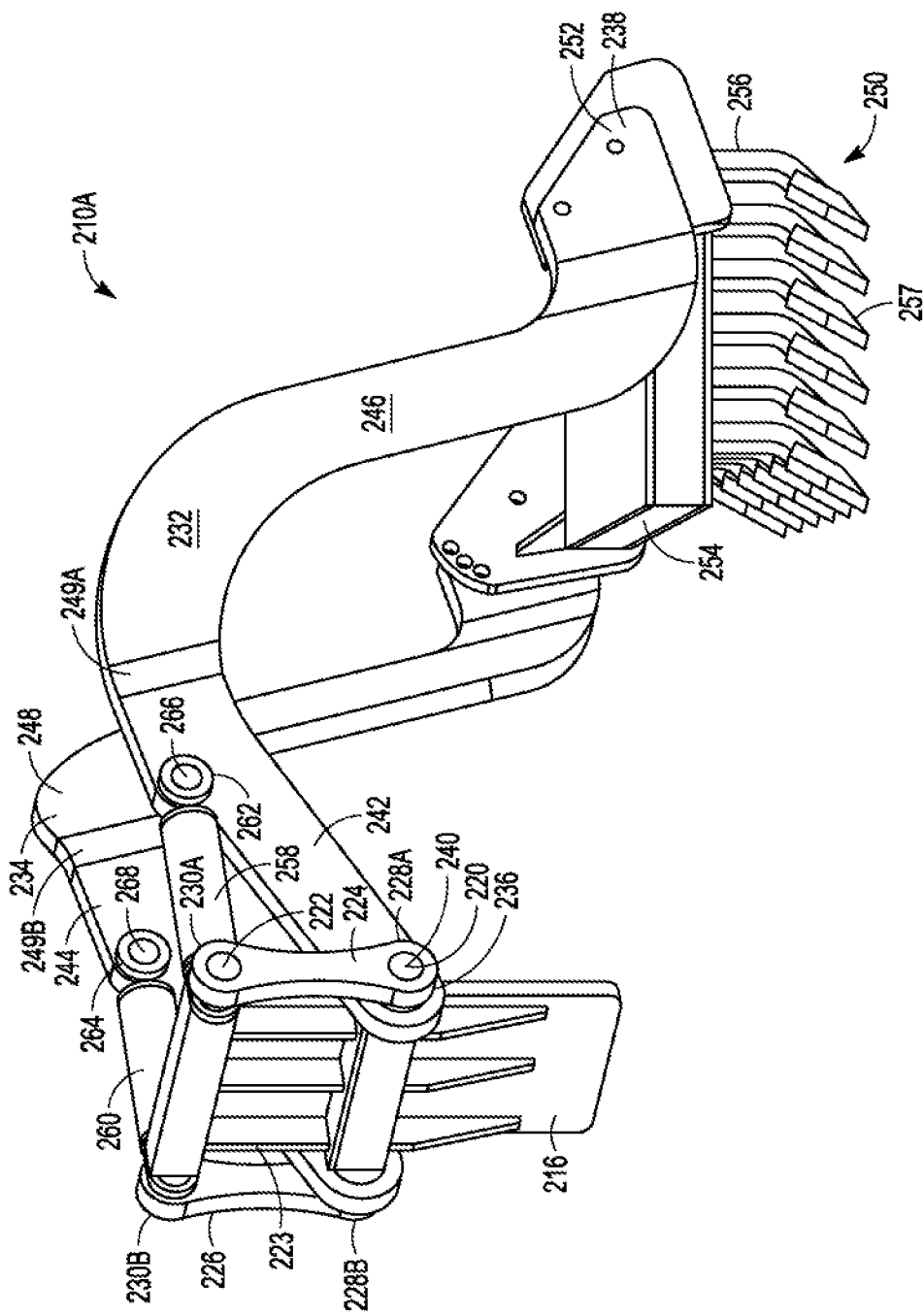
FIG. 2 is a perspective view of an exemplary scarifier system.
Figure 3:
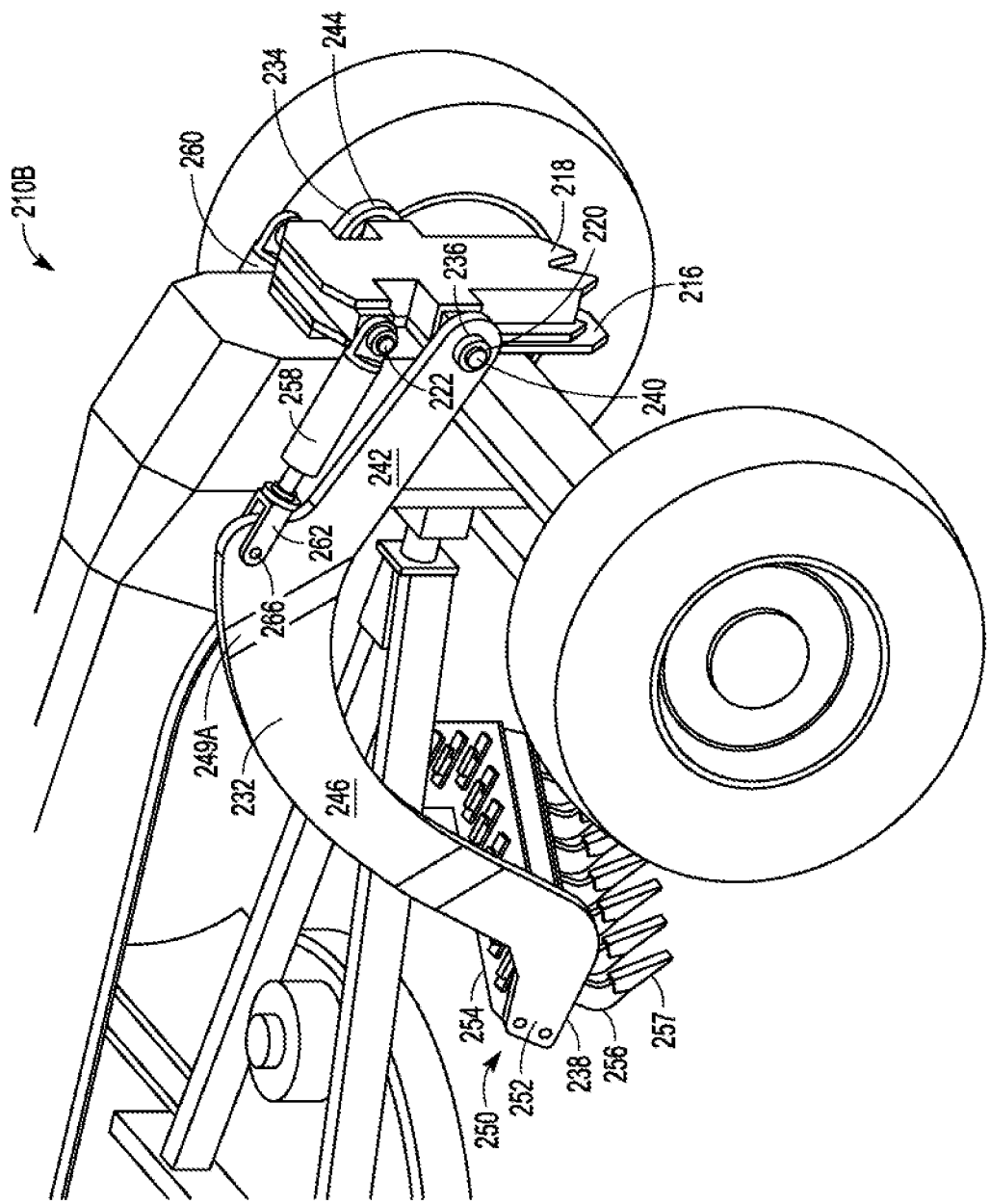
FIG. 3 is a perspective view of an exemplary scarifier system coupled to a portion of a frame.

FIGS. 2-3 illustrate example scarifier systems 210A and 210B. Each scarifier system 210A and 210B, in an example is the scarifier system 42 of the motor grader 10 of FIG. 1. In an example, the scarifier systems 210A and 210B are manufactured separately from a motor grader and retrofitted to an existing motor grader. In another example, the scarifier systems 210A and 210B are manufactured as a system coupled to the frame of a motor grader.

The scarifier systems 210A and 210B include a plate element 216 that in one example is a bolster plate, or pushblock. Specifically, a second plate element 218 can be coupled in spaced relation to the first (FIG. 3) to provide a surface for attachment of an implement such as a dozer blade system or the like. Specifically, the second plate element 218 is formed to receive the implement. First and second pin members 220 and 222 are coupled to the plate element 216 and optionally to second plate element 218 and are aligned in parallel spaced relation to one another. Pin members in an example are cylindrical in shape and made from steel. In another example, the first pin member 220 is a pivot pin while the second pin member 222 is a cylindrical support pin. While shown with a plate element 216 for coupling to an end of a frame, the scarifier systems 210A and 210B in another example eliminates the plate element 216 and the first and second pin members 220 and 222 are disposed through the frame of a motor grader and secured adjacent the front end. Rib elements 223 extend on the plate element 216 including between the first pin member 220 and the second pin member 222 for additional structural support.

In an example, (FIG. 2) first and second linkage elements 224 and 226 are coupled to the first and second pin members 220 and 222 to interconnect the first and second pin members 220 and 222. Specifically, the first pin member 220 is disposed through a first end 228A, 228B of each linkage element 224 and 226, while the second pin member 222 is disposed through a second end 230A, 230B of each linkage element 224 and 226. In another example, (FIG. 3) the plate element 216 is a first plate element and a second plate element 218 couples to the pin members 220, 222 and first plate element 216 to interconnect the first and second pin members 220 and 222. In both embodiments and other example embodiments, the first and second pin members are interconnected such that forces are shared between the first and second pin members 220 and 222.

First and second arcuate drawbar arms 232 and 234 extend from a first end 236 to a second end 238 and are coupled to the first pin member 220 at the first end 236. Specifically, the first pin member 220 is disposed through an opening in the first arcuate drawbar arm 232 and similarly through an opening in the second arcuate drawbar arm 234 such that the first and second arcuate drawbar arms 232 and 234 pivot about a pivot axis 240 of the first pin member 220.

Each arcuate drawbar arm 232, 234 has a coupling section 242, 244 that in one embodiment are each secured to the first pin member 220. When the scarifier systems 210A or 210B are mounted on a frame of a motor grader, the first and second coupling sections 242 and 244 extend in parallel spaced relation from the first pin member parallel to the frame of the motor grader and terminate in spaced arcuate sections 246, 248 at first and second knees 249A and 249B. When the scarifier systems 210A or 210B are mounted on a frame of a motor grader, the first and second arcuate sections 246, 248 curve both away from the first end 236 of the drawbar arms 232 and 234, and outwardly, away from the frame of the motor grader. Thus, each arcuate section 246 and 248 extends away from the other arcuate section such that the arcuate sections 246, 248 do not extend parallel to one another and instead extend on diverging pathways. Therefore, the arcuate drawbar arms 232 and 234 extend such that the distance between the arm elements at the first end 236 is less than the distance between the arm elements 232 and 234 at the second end 238. In another example, the arcuate sections 246 and 248 extend in parallel spaced relation to one another. In each example, when mounted onto a motor grader frame the arcuate arm elements 232 and 234 avoid contact with the front wheels, axle, and DCM system even when the motor grader traverses rough and bumpy terrain.

The arcuate sections 246, 248 extend to the second end 238 of the drawbar arms 232, 234 and couple to a carriage 250. By increasing the distance between the arcuate arm elements 232 and 234 at the second end 238 compared to the first end 236, a larger carriage 250 is accommodated resulting in a wider path coverage of the carriage 250.

The carriage 250 is coupled to the second end 238 of the first and second arcuate drawbar arm elements 232 and 234 in any manner. The coupling can occur with coupling plates 252 of the arcuate sections 246 and 248 or carriage 250 that secure to a top surface of the carriage, coupling plates 252 of the arcuate sections 246 and 248 or carriage 250 that secure to side surfaces of the carriage, or any combination of surfaces. The carriage 250 also includes a body 254 that couples to shanks 256 that each couple to a tooth 257. The teeth 257 generally extend into a point that engages the ground to dig into and break up and ground when the carriage 250 is in an operational position.

The scarifier systems 210A and 210B also include first and second actuators 258 and 260 coupled between the plate element 216 and the first and second arcuate arm elements 232 and 234. In one embodiment, the first and second actuators 258 and 260 are secured to the second pin member 222. Specifically, the first actuator 258 is secured to the second pin member 222 adjacent the first linkage element 224 (FIG. 2) or eyelet opening (FIG. 3), while the second actuator 260 is spaced from the first actuator 258 and secured to the second pin member 222 adjacent the second linkage element 226 (FIG. 2) or other eyelet opening. In one example the first and second actuators 258 and 260 are hydraulic actuators such as hydraulic cylinders coupled to the hydraulic system of the motor grader 10 that hydraulically actuate the actuators 258 and 260. Alternatively, in another example a motor mechanically actuates the actuators 258 and 260.

In one embodiment, the first and second actuators 258 and 260 are coupled to the first and second arcuate drawbar arms 232 and 234 at the first and second coupling sections 242 and 244 at first and second joint elements 262 and 264. In an example, the first and second joint elements 262 and 264 are eyelet openings of the actuators 258 and 260 that receive pin members 266 and 268 of the first and second coupling sections 242 and 244 of the first and second arcuate drawbar arms 232 and 234. Coupling the first and second actuators 244 and 246 to the first and second coupling sections 242 and 244 adjacent the first and second pin members 220 and 222, instead of to the arcuate sections 246 and 248 of the arcuate drawbar arms 232 and 234, minimizes the length of the actuators 258 and 260 compared to systems that attach to arcuate sections. The reduced length eliminates unnecessary support structure, welding, and linkage that can cause line of sight issues for motor grader drivers, and design constraints.

When operating, the first and second actuators 258 and 260 rotate the first and second arcuate arm elements 232 and 234 about the pivot axis 240. In an example, the first and second actuators 258 and 260 are hydraulic actuators such as hydraulic cylinders that are fluidly coupled to the hydraulic system of the motor grader. In such an example, extending and retracting the hydraulic cylinder rotates the first and second arcuate drawbar arms 232 and 234 about the pivot axis 240 of the first pin member 220 to allow an operator to control the height of the carriage 250 from the cab or seat of the motor grader.

Exemplary methods of use of the scarifier system are discussed in the following section in order to further illustrate the concepts discussed above.

INDUSTRIAL APPLICABILITY

Disclosed exemplary systems and methods provide a scarifier system 42, 210A, or 210B that reduces system complexity, provides improved spacing with other assemblies and systems of a motor grader, and reduces manufacturing time and costs for manufacturing a motor grader 10 and scarifier system 42, 210A, or 210B. Specifically, the actuators 60 or 258, 260 couple directly to the arcuate drawbar arms 50 or 232, 234 at or adjacent the front end of the frame 12, thus eliminating the need for additional linkage and minimizing the length of the actuators 60 or 258, 260. The direct mounted actuators 60 or 258, 260 located at or adjacent the front end, or bolster, creates a long lever arm that carries the load. However, as a result of this positioning, the drawbar arms 50 or 232, 234 do not have to swing up and over the axle, and can be shorter and stiffer to support the load.

When an operator desires to utilize the scarifier system 42, 210A, or 210B, the operator operates the control system 20 to move the actuators 60 or 258, 260. In one example, the actuators 60 or 258 and 260 are hydraulic cylinders fluidly connected to the hydraulic system of the motor grader 10. When moving the carriage 54 or 250 from the non-working to a working position where the teeth 58 or 257 engage to disrupt the ground, the hydraulic cylinders extend, rotating the arcuate drawbar arms 50 or 232, 234 and thus carriage 54 or 250 about the pivot axis 64 or 240 of the first pin member 46 or 220. As the arcuate drawbar arms 50 or 232, 234 and carriage 54 or 250 rotate about the pivot axis 64 or 240, the extended hydraulic cylinders remain above the wheels 22 of the frame 12 and the DCM system 24. Similarly, the other components such as linkage elements 224, 226 and plates 216, 218 remain mounted on the front end of the frame 12, again, away from contact with wheels 22 or the DCM system 24. Meanwhile, based on the shape of the arcuate drawbar arms 50 or 232, 234 and position of the carriage 54 or 250, even as the motor grader 10 traverses harsh or bump terrain in a working position, engagement of any part of the scarifier system 42, 210A, or 210B to the wheels 22, DCM system 24, frame 12, and other assemblies and systems of the motor grader 10 is minimized. Specifically, the arcuate drawbar arms 50 or 232, 234 avoid the DCM system pathway. Once the carriage 54 or 250 is in a desired working location, the operator stops extending the hydraulic cylinders, keeping them in an extended position.

When the scarifier system 42, 210A, or 210B is no longer desired to be utilized, the operator again operates the control system 20 to operate the actuators 60 or 258, 260, or hydraulic cylinders in this example. At this time, the hydraulic cylinders retract, pulling the arcuate drawbar arms 50 or 232, 234 towards the front end and thus rotating the drawbar arms 50 or 232, 234 about the pivot axis 64 or 240 of the first pin member 220. The hydraulic cylinders retract until completely retracted, at which point the carriage 54 or 250 is back in an original non-work position. During this retracting, the hydraulic cylinders remain above the wheels 22 and DCM system 24 while the shape and positioning of the arcuate drawbar arms 50 or 232, 234 and carriage 54 or 250 avoid and minimize potential engagement with wheels 22, the DCM system 24, or other assembly or system coupled to the frame 12.

In all, because the actuators 60 or 258, 260 are coupled to the frame 12 and directly to the arcuate drawbar arms 60 or 232, 234, additional linkage, lift arms, or other assemblies are not needed to lower and raise the carriage 54 or 250. Additionally, the coupling occurs adjacent the end of the frame, resulting in minimal spatial requirements for the first and second actuators 60 or 258, 260 compared to other scarifier systems that utilize linkage or permanently welded ball studs to provide the connection. By eliminating linkage, welds, and the like, complexity of the system is reduced, less components have an opportunity of contacting each other causing undesired wear and damage of components. Additionally, the line of site between the operator and the scarifier is not impeded. This also allows more room for other mid-mounted devices, such as the DCM system 24, eliminating design constraints. As an example, instead of utilizing a Y-frame as a support frame 28, the DCM system can utilize a bulkier support frame such as an A-frame that is more prevalent and less expensive. Additionally, by eliminating the linkage, additional flexibility with frame shape and design occurs as well, reducing manufacturing time and costs for the motor grader. Also, because the scarifier system 42, 210A, 210B in example embodiments utilizes simple connection points, such as bolts instead of welding, retrofitting and replacement of the scarifier system to existing frames of motor graders is facilitated.

It will be apparent to those skilled in the art that various modifications and variations can be made to the disclosed motor grader 10 and scarifier systems 42, 210A, and 210B without departing from the scope of the disclosure. Other embodiments of the motor grader 10 and scarifier systems 42, 210A, and 210B will be apparent to those skilled in the art from consideration of the specification and practice of the methods disclosed herein. It is intended that the specification and examples be considered as exemplary only, with a true scope of the disclosure being indicated by the following claims and their equivalents.

What is claimed is:

1. A motor grader comprising:
    a frame having a front end and a rear end;
    a scarifier system connected to the motor grader at the front end of the frame, the scarifier system comprising:
        a first pin member coupled to and in fixed relation with the front end of the frame;
        a second pin member coupled to and in fixed relation with the front end of the frame, the second pin member in spaced relation to the first pin member;
        a first arcuate drawbar arm coupled to the first pin member at a front end of the first arcuate drawbar arm arranged toward the front end of the frame;
        a second arcuate drawbar arm coupled to the first pin member at a front end of the second arcuate drawbar arm arranged toward the front end of the frame;
        a carriage coupled to a rear end of each of the first arcuate drawbar arm and the second arcuate drawbar arm; and
        an actuator coupled to the first arcuate drawbar arm between the front and rear end of the first arcuate drawbar arm and to the second pin member to rotate the carriage about a pivot axis of the first pin member.

2. The motor grader of claim 1, wherein a linkage element interconnects the first pin member to the second pin member.

3. The motor grader of claim 1, the scarifier system further comprising:
    a plate element secured to the front end of the frame and coupled to the first pin member and second pin member.

4. The motor grader of claim 3, wherein plate element is a first plate element, the scarifier system further comprising: a second plate element coupled to the first pin member and second pin member and formed to receive an implement.

5. The motor grader of claim 1, wherein the first pin member is a pivot pin.

6. The motor grader of claim 5, wherein the second pin member is in parallel spaced relation to the first pin member and is a cylindrical pin.

7. The motor grader of claim 1, wherein the actuator is a hydraulic cylinder.

8. The motor grader of claim 1, wherein the actuator is a first actuator and the scarifier system further comprising:
    a second actuator coupled to the second arcuate drawbar arm and to the second pin member to rotate the carriage about the pivot axis of the first pin member.

9. The motor grader of claim 1, wherein the first arcuate drawbar arm has a coupling section that couples to the first pin member, and an arcuate section that extends away from the coupling section and couples to the carriage.

10. The motor grader of claim 9, wherein the actuator receives a pin member of the coupling section of the first arcuate drawbar arm above the frame to couple the actuator to the first arcuate drawbar arm.

11. The motor grader of claim 10, wherein the arcuate section of the first arcuate drawbar arm has a coupling plate that mounts to the carriage.

12. A scarifier system comprising:
    first and second pin members coupled to a plate element and interconnected to a second pin member coupled to the plate element, the plate element configured to be connected to a front end of a frame of a work machine, and the first and second pin members in fixed relation with the front end of the frame;
    a first arcuate drawbar arm coupled to the first pin member at a front end of the first arcuate drawbar arm;
    a second arcuate drawbar arm coupled to the first pin member at a front end of the second arcuate drawbar arm;
    a carriage coupled to a back end of each of the first arcuate drawbar arm and the second arcuate drawbar arm; and
    an actuator coupled to the first arcuate drawbar arm between the front and back end of the first arcuate drawbar arm and to the second pin member to rotate the carriage about a pivot axis of the first pin member.

13. The scarifier system of claim 12, wherein a linkage element interconnects the first pin member to the second pin member.

14. The scarifier system of claim 12, further comprising means for actuating the actuator.

15. The scarifier system of claim 12, wherein the first pin member is a pivot pin.

16. The scarifier system of claim 12, wherein the first arcuate drawbar arm has a coupling section that couples to the first pin member and an arcuate section that extends away from the coupling section and couples to the carriage.

17. The scarifier system of claim 16, wherein the actuator receives a pin member of the coupling section of the first arcuate drawbar arm to couple the actuator to the first arcuate drawbar arm.

18. A method of manufacturing a scarifier, the method comprising:
   coupling a first pin member and second pin member to a plate element, the plate element configured to be connected to a front end of a frame of a work machine, and the first and second pin members in fixed relation with the front end of the frame;
   pivotably securing a front end of a first arcuate drawbar arm and a front end of a second arcuate drawbar arm to the first pin member;
   mounting a carriage to a rear end of each of the first arcuate drawbar arm and the second arcuate drawbar arm; and
   pivotally coupling an actuator to the second pin member and the first arcuate drawbar arm between the front and rear ends of the first arcuate drawbar arm.

19. The method of claim 18 wherein the actuator is a hydraulic cylinder.

20. The method of claim 19 wherein extending and retracting the hydraulic cylinder rotates the first arcuate drawbar arm about a pivot axis of the first pin member.

* * * * *